P. SAURUSAITIS.
ALTAR BREAD SOFTENER.
APPLICATION FILED DEC. 1, 1915.
1,239,973.
Patented Sept. 11, 1917.
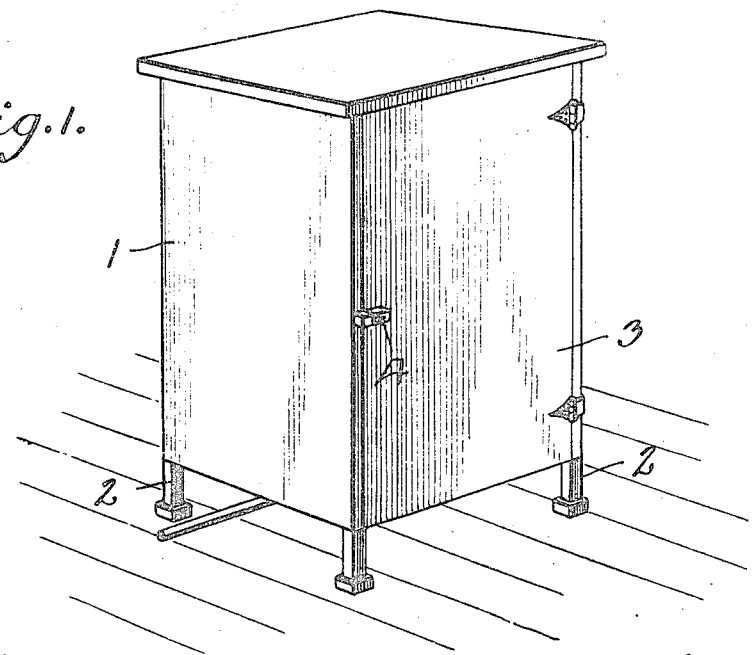
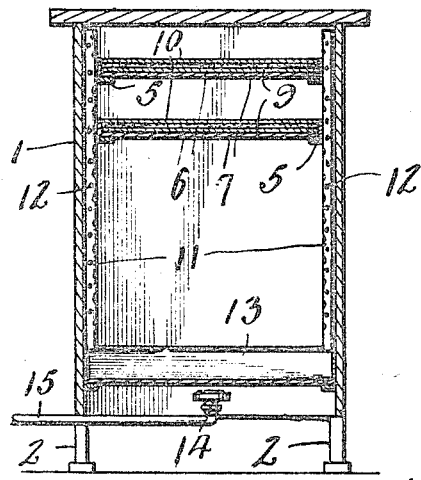
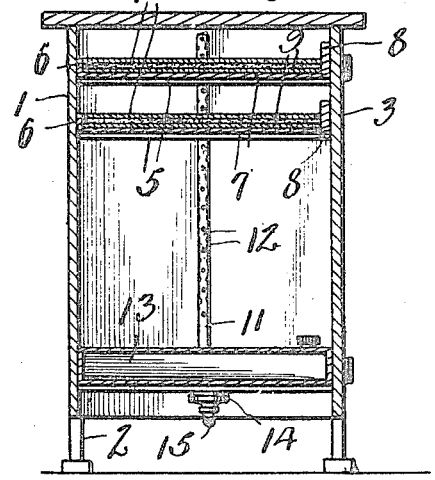
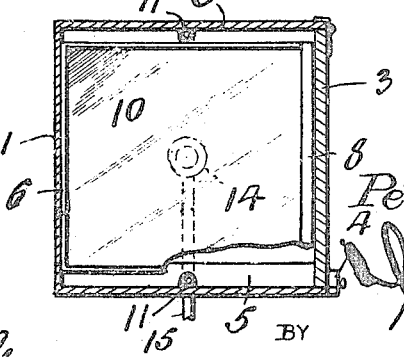
WITNESSES
INVENTOR
Peter Saurusaitis,
BY
ATTORNEY

UNITED STATES PATENT OFFICE.

PETER SAURUSAITIS, OF WATERBURY, CONNECTICUT.

ALTAR-BREAD SOFTENER.

1,239,973.  Specification of Letters Patent.  Patented Sept. 11, 1917.

Application filed December 21, 1915. Serial No. 67,984.

*To all whom it may concern:*

Be it known that I, PETER SAURUSAITIS, a citizen of the United States, residing at Waterbury, in the county of New Haven and State of Connecticut, have invented certain new and useful Improvements in Altar-Bread Softeners, of which the following is a specification.

This invention relates to certain novel and useful improvements in devices for softening bread and has particular application to a device for softening altar bread.

In carrying out my present invention, it is my purpose to provide a bread softening device which will be found especially useful by clergymen and assistants in certain religious denominations for maintaining the altar bread soft so that such bread may be cut into wafers without producing crumbs, thereby enabling the wafers to remain intact during the cutting of bread.

It is also my purpose to provide a device of the class described, which will embrace the desired features of simplicity, efficiency and durability, which will operate efficiently and effectively for its intended purpose, and which will be small and compact in construction.

With the above and other objects in view, the invention consists in the construction, combination and arrangement of parts hereinafter set forth in and falling within the scope of the appended claim.

In the accompanying drawing:

Figure 1, is a perspective view of a device constructed in accordance with the invention.

Fig. 2, is a vertical sectional view therethrough.

Fig. 3, is a similar view taken at right angles to Fig. 2.

Fig. 4, is a horizontal sectional view through the device.

Similar reference characters indicate corresponding parts throughout the several views in the drawing.

Referring now to the drawing in detail, 1 designates a cabinet constructed of any suitable or desired material and mounted upon legs 2. The front wall of the cabinet 1 is provided with a door opening, and hinged to one vertical wall of the door opening is a door 3 capable of swinging movement to open and closed position and equipped with a lock 4 whereby the door may be locked in closed position. The side walls of the cabinet 1 are equipped with pairs of horizontal guide strips 5 and the guide strips of each pair on each side wall of the cabinet are appropriately spaced apart from each other and aline with the corresponding strips on the other side wall of the cabinet. Slidably mounted within the ways formed between the corresponding guide strips is a tray 6 embodying a horizontal bottom wall 7 and a vertical front wall 8 of a depth substantially equal to the width of the ways between the particular guide strips. Mounted upon the bottom of each tray is a glass plate 9 and upon this plate is placed the bread, and seated upon the bread is a second glass plate 10. The horizontal guide strips on each side wall of the casing are formed with vertically alining openings and passed through these alining openings are pipes 11. The pipes 11 at each side of the cabinet are suitably spaced apart and each pipe is formed with a series of discharge apertures 12. 13 designates a tank adapted to contain a quantity of water. This tank is mounted in the bottom of the cabinet and is in open communication with the lower ends of the distributing pipes 11, while disposed below the tank 13 and suitably secured to the bottom wall of the cabinet is a gas burner 14 connected by means of a pipe 15 with a suitable source of gas supply.

It is to be understood that the gas burner 14, may be entirely dispensed with and in this instance the water in tank 13 and distributing pipes 11, will remain cool, and the moisture therefrom will serve to soften the bread within the cabinet.

In practice, the bread is placed upon the respective trays between the glass plates and the burner 14 set in operation. However, if the burner 14, is not used the cold water will give forth moisture which serves to soften the bread. The heat from the burner is transmitted to the water in the tank 13 and the water in the tank generates steam. This steam passes upwardly through the pipes 11 and is discharged through the openings 12, across the trays and contacts with the bread on the trays, thereby softening the bread so that the same may be cut into wafers without producing crumbs.

It will be seen that I have provided a device whereby altar bread may be softened preparatory to cutting the same into wafers, and, in actual practice, it is only necessary to let the bread remain in the cabinet for a short period of time before cutting.

While I have herein shown and described one preferred form of my invention by way of illustration, I wish it to be understood that I do not limit or confine myself to the precise details of construction herein described and delineated, as modifications and variations may be made within the scope of the claim without departing from the spirit of the invention or sacrificing any of its advantages.

What is claimed is:

In a device of the kind described, in combination, a cabinet, pairs of vertically spaced apart longitudinal guide strips secured upon two opposing walls of said cabinet at right angles thereto, a water-receiving tank secured at the lower end of said cabinet, a burner supported directly under said tank and adapted to heat the contents thereof to form steam, said strips being formed with medial recesses directly adjacent the walls of said cabinet, vertically disposed pipes passing through said recesses and secured at their lower ends upon said tank, said pipes extending toward the upper end of said cabinet and formed with a longitudinal series of steam-escaping ports, and a plurality of trays slidably supported on said strips and having opposite walls contacting said pipes.

In testimony whereof I affix my signature in presence of two witnesses.

PETER SAURUSAITIS.

Witnesses:
BEATRICE H. BOWN,
MARY C. O'NEILL.